United States Patent [19]

Takahashi et al.

[11] Patent Number: 5,148,200
[45] Date of Patent: Sep. 15, 1992

[54] METHOD AND APPARATUS FOR DRIVING THE TAKING LENS SYSTEM OF A CAMERA

[75] Inventors: Minoru Takahashi; Mitsuo Yokota, both of Saitama, Japan

[73] Assignee: Fuji Photo Film Co., Ltd., Kanagawa, Japan

[21] Appl. No.: 662,245

[22] Filed: Feb. 28, 1991

[30] Foreign Application Priority Data

Feb. 28, 1990 [JP] Japan .................. 2-48754
Feb. 28, 1990 [JP] Japan .................. 2-48755
Feb. 28, 1990 [JP] Japan .................. 2-48756
Mar. 5, 1990 [JP] Japan .................. 2-51755

[51] Int. Cl.$^5$ .............................. G03B 1/18
[52] U.S. Cl. .................................. 354/195.1
[58] Field of Search ............... 354/195.1, 195.12, 400, 354/402; 355/55, 56; 318/630; 358/227; 359/694, 696, 705, 706, 823, 826

[56] References Cited

U.S. PATENT DOCUMENTS 4,857,947 8/1989 Wakabayashi et al. .......... 354/195.1
4,896,177 1/1990 Kazami et al. ................ 354/195.1 X
4,936,664 6/1990 Haraguchi et al. ................. 359/696

Primary Examiner—L. T. Hix
Assistant Examiner—Howard B. Blankenship
Attorney, Agent, or Firm—Young & Thompson

[57] ABSTRACT

A lens driving apparatus is provided with an encoder for detecting the position of a taking lens system. The encoder has a contact array including a main contact corresponding to a predetermined focal length position of a taking lens system and a sub-contact which is spaced slightly from the main contact. When a focal length changeover switch is operated to set the taking lens system in the desired focal length position, a motor is driven at a high speed until the sub-contact is detected and thereafter is driven at a low speed until the main contact is detected. So as to stop the taking lens system at the focal length position always after moving in one direction, when the taking lens system is to move in the other direction for changing over from a first to a second focal length position, the motor is driven at a high speed to move the taking lens system in the other direction until the encoder switches off the sub-contact corresponding to the second focal length position after detecting that sub-contact, and then the motor is driven at a low speed to move the taking lens system in the one direction until the associated main contact is detected. The taking lens system may be stopped when an end of a main contact is detected, and is moved into the predetermined focal length position that corresponds to the opposite end of the main contact when the shutter release button is operated.

26 Claims, 7 Drawing Sheets

METHOD AND APPARATUS FOR DRIVING THE TAKING LENS SYSTEM OF A CAMERA

BACKGROUND OF THE INVENTION

The present invention relates to a vari-focal (variable focal length) camera, especially to a method and apparatus for driving the taking lens system of a vari-focal camera.

Vari-focal cameras are in widespread use and have a taking lens system that is variable in focal length, for example, between a short focal length position such as a wide-angle position and a long focal length position such as a telephoto position by moving the lens barrel along the optical axis. The lens barrel is driven by a motor upon operation of a switch, so that the vari-focal camera is easy to operate.

Such a vari-focal taking lens system comprises a movable lens group and a stationary lens group which are mounted in a movable lens barrel and a stationary lens barrel, respectively. The focal length is changed by moving the movable lens barrel axially back and forth relative to the stationary lens barrel, using a motor. Meanwhile, the taking lens system must be stopped precisely at a designated predetermined position such as the wide-angle or telephoto position. Therefore, it is necessary to detect the lens position. An encoder has been generally used for this purpose, and the motor is stopped when it is detected by the encoder that the taking lens system is positioned in a predetermined position.

The motor is generally driven by DC current, so that the motor is not able to stop immediately after being disconnected from the DC current, and may overrun the predetermined position. For this reason, it is conventional to provide a dead zone such as an idling portion in a power transmission mechanism for transmitting rotational power of the motor to the taking lens system so that the overrun of the motor may be absorbed in the dead zone. In this way, the taking lens system is prevented from moving beyond the predetermined position even when the motor overruns. Furthermore, in order to prevent overrunning, the motor is rotated alternately in opposite directions about a position wherein the encoder detects the designated position of the taking lens system, thereby to stop the taking lens system in the designated position after moving it an appropriate number of times back and forth through that position.

On the other hand, in such a taking lens system as described above, even when the encoder indicates that the taking lens system has stopped in the predetermined position, the actual stopped position thereof can be slightly different when stopping after moving in one direction compared with stopping after moving in the opposite direction. This is because a lens driving mechanism including male and female screw threads, one of which is rotated to move the movable lens barrel, has backlash. The same problem also arises in a vari-focal camera wherein the taking lens system is moved by a combination of a pin and a cam groove provided in a movable lens barrel and a stationary lens barrel because of play between the pin and cam groove. Therefore, in order to stop the taking lens system each time precisely at a predetermined position, it is necessary to stop the movable lens barrel at the predetermined position always after moving finally in a predetermined direction. That is, if the lens barrel is predetermined to stop at a final position always after moving forwardly, then when the lens barrel must be retracted to be in a designated position, the lens barrel must be further moved rearwardly beyond the designated position and then moved forwardly toward the designated position.

However, a power transmission mechanism having such a dead zone as described above is complicated in construction and must be accurately constructed in order to absorb with precision the overrun of the motor.

For such a lens driving device wherein the taking lens system is moved repeatedly back and forth before being stopped at a predetermined position, a complex control system is necessary.

Additionally, if the movable lens barrel is accidentally touched or pulled out after being stopped at a predetermined position before the depression of the shutter release button, the taking lens system may be displaced from the predetermined position. In such a case, the photographer cannot detect the displacement, so that the pictures taken in this condition may be out of focus. Providing a lock mechanism for securely maintaining the lens barrel in the predetermined position would make the camera cumbersome to operate.

OBJECTS OF THE INVENTION

In view of the foregoing, it is an object of the present invention to provide a lens driving method and apparatus for a vari-focal camera, which makes it easy to stop the taking lens system precisely at a predetermined position after moving it always in a predetermined direction, at the same time that the power transmission mechanism for transmitting the rotational power of the motor for driving the taking lens system, as well as the control system for driving the motor, can be simple in construction.

It is another object of the invention to provide a lens driving method wherein the taking lens system is not displaced from the predetermined position even if an additional or external force is applied to the movable lens barrel.

According to the invention, a lens driving apparatus is provided with an encoder for detecting the position of a taking lens system which has a constant array including a main contact corresponding to a predetermined focal length position of a taking lens system and a sub-contact which is staggered slightly from the main contact, wherein when a focal length changeover switch is operated to set the taking lens system in the predetermined focal length position, the motor is driven at a high speed until the sub-contact is detected and thereafter is driven at a low speed until the main contact is detected.

In case the motor is driven by DC current, the motor may be braked or may be driven by pulsed current to rotate it at a low speed after detection of the sub-contact.

Because the motor is driven at a low speed immediately before being stopped, it becomes possible to stop the motor at the instant the main contact corresponding to the predetermined focal length position is detected, so that the taking lens system is precisely positioned in the predetermined focal length position.

If it is predetermined that the rotation of the motor should be terminated at any focal length position always after rotating in the same direction, then when the motor has to rotate in the other direction so as to change over the taking lens system from a first to a second focal length position, the motor is driven at a high speed to rotate in that other direction until the encoder switches off the subcontact corresponding to the second focal length position after detecting that sub-contact, and then the motor is driven at a low speed to rotate in the one direction until the associated main contact is detected.

According to another preferred embodiment, when the focal length changeover switch is operated, the taking lens system is moved until an end of a main contact corresponding to a designated focal length position is detected, and stands by at this position, and is moved, upon operation of a shutter release switch, until the other end of the main contact is detected. In this way, even if the lens position deviates because of an external force after positioning the taking lens system responsive to the focal length changeover switch, since the taking lens system is further moved into the predetermined focal length position when the shutter release button is operated, the focus of the taking lens system at the moment of actual shutter release operation will not be lost.

The sub-contact preferably covers a broader range than the associated main contact, so that the encoder can detect the lens position on the basis of the sub-contact even after the detection of the other end of the main contact.

BRIEF DESCRIPTION OF THE DRAWINGS

The above and other objects and advantages of the invention will become apparent from the following description of preferred embodiments thereof with reference to the accompanying drawings, in which like parts and elements are designated by the same reference numerals throughout the several views of the drawings and wherein.

DETAILED DESCRIPTION OF THE PREFERRED EMBODIMENTS

Figure 2:
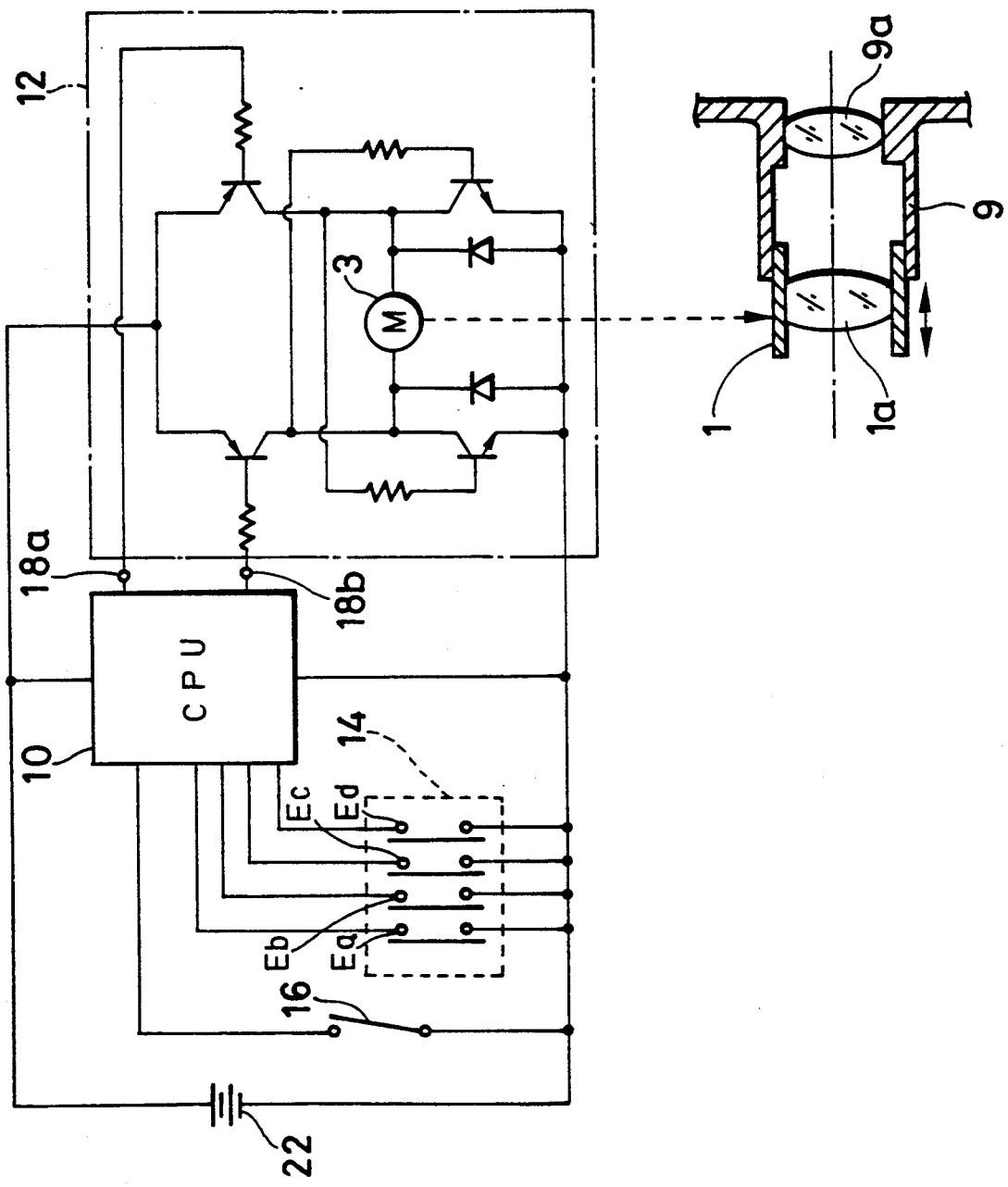
FIG. 2 is a diagram showing circuitry of the lens driving device.

Referring to FIG. 2, a movable lens barrel 1 is slidably mounted in a stationary lens barrel 9 which is secured to a not-shown camera body. The movable lens barrel 1 is slidable along the optical axis of a taking lens system whose movable lens group 1a is held in the movable lens barrel 1 and whose stationary lens group 9a is held in the stationary lens barrel 9. Thus, the taking lens system is composed of these lens groups. The movable lens barrel 1 can be moved between three positions, i.e. a rest position wherein the movable lens barrel is completely retracted into the stationary lens barrel 9, a wide-angle position wherein the movable lens barrel 1 protrudes somewhat therefrom, and a telephoto position wherein it protrudes the maximum from the stationary lens barrel 9. The focal length of the taking lens system is short in the wide-angle position, and long in the telephoto position.

Figure 1:
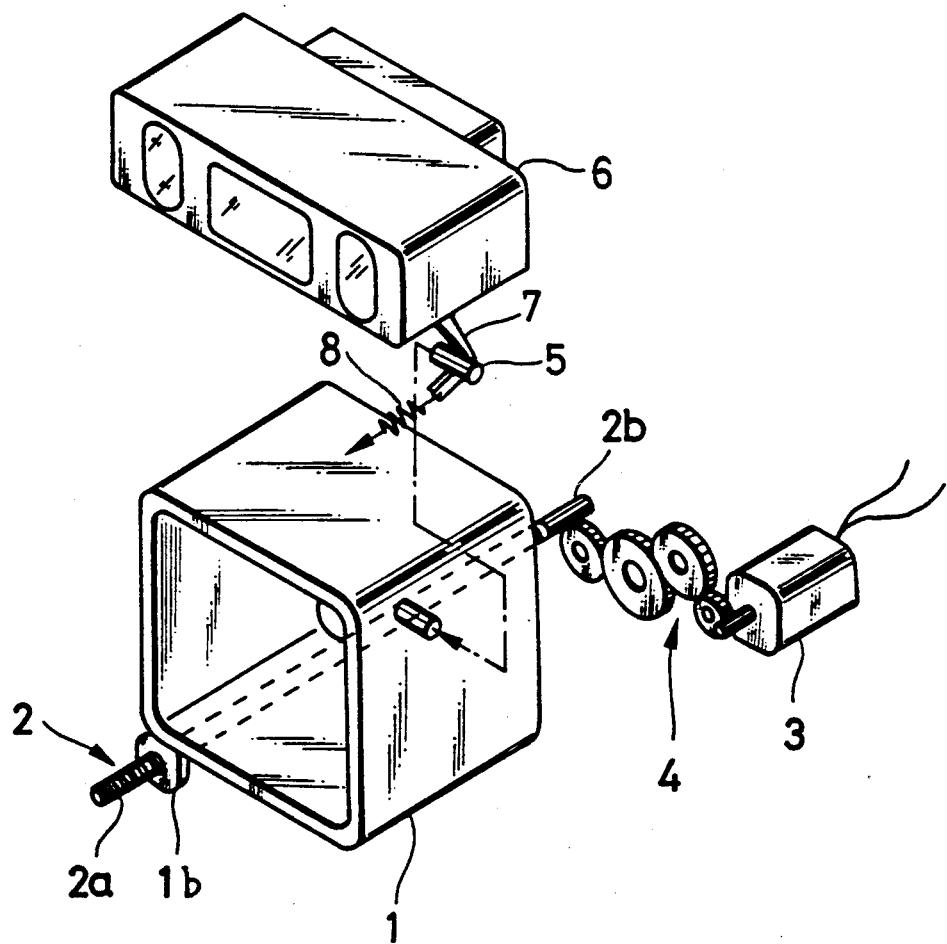
FIG. 1 is an exploded perspective view showing essential parts of a lens driving device embodying the present invention.

As shown in FIG. 1, on the outer surface of the bottom wall of the movable lens barrel 1, near the front end thereof, there is provided a guide lug 1b formed with a female screw thread which engages with a screw thread 2a on the front end of a driving rod 2 extending in the direction of the optical axis. The rear end of rod 2 is formed with gear teeth 2b engaging with a gear train 4, through which rotational power from a motor 3 is transmitted to the rod 2. Accordingly, when the motor 3 rotates, the rod 2 rotates to cause the lens barrel 1 to move axially back and forth relative to the guide lug 1b. The moving direction of the lens barrel 1 is in accordance with the rotational direction of the motor 3.

In this embodiment, a pin 5 is mounted on the upper outer surface of a side wall of the lens barrel 1. The pin 5 engages with a switching lever 7 of a viewfinder unit 6 and moves with the lens barrel 1 to actuate the lever 7. The lever 7 is urged by a spring 8 into contact with the pin 5. As the lens barrel 1 moves, the lever 7 is actuated to move the optical system of the viewfinder unit 6 and switches over the magnification of the viewfinder according to the change of focal length of the taking lens system. As a result, the photographer can recognize which focal length position, for example, a tele- or wide-angle position, the taking lens system occupies, while looking through the viewfinder.

The position of the lens barrel 1 and hence the position of the movable lens group is detected by an encoder in a conventional manner. FIG. 2 shows circuitry of the lens driving device of the invention, wherein a CPU 10 controls a motor drive circuit 12 while monitoring the output signal from the encoder 14. The CPU 10 is supplied with a switching signal from a switch 16 which is manually operated for changing the focal length of the taking lens system. First and second output ports 18a and 18b of the CPU 10 are connected respectively to first and second terminals of a DC motor 3, such that the DC motor 3 rotates in one direction when a motor drive signal is outputted from the first output port 18a, and rotates in the reverse direction when a motor drive signal is outputted from the second output port 18b. The CPU 10 and the motor drive circuit 12 are connected to a DC power source, such as a battery 22.

Figure 3:
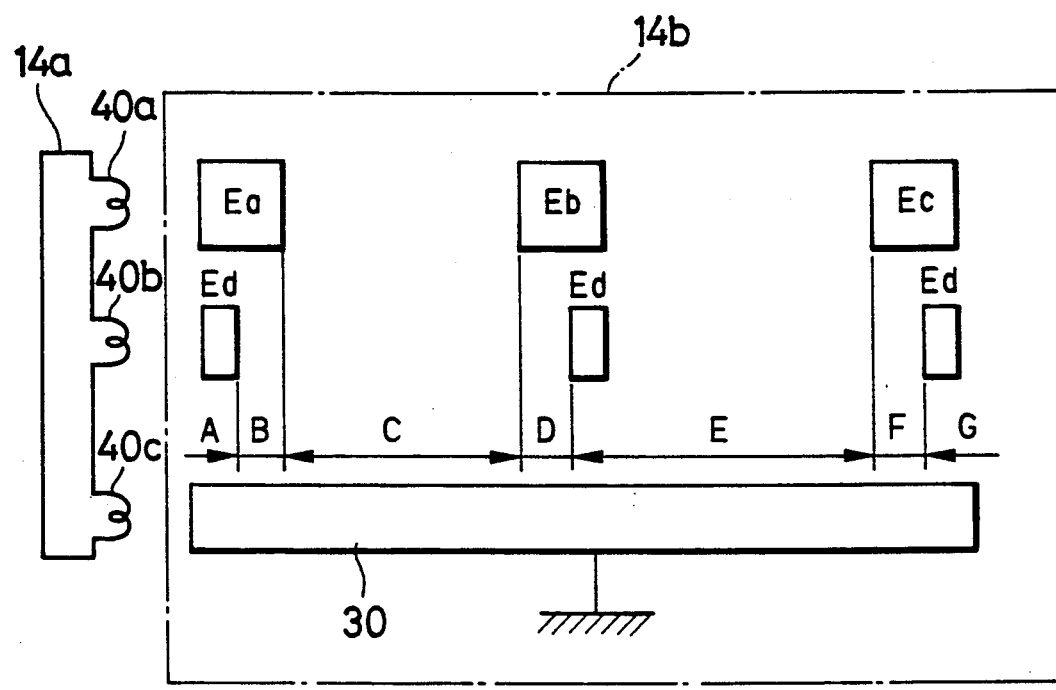
FIG. 3 shows schematically a first embodiment of the encoder of the lens driving device.

As shown in FIG. 3, the encoder 14 comprises a brush 14a and a contact array 14b which are mounted on the movable lens barrel 1 and the stationary lens barrel 9, respectively. In this embodiment, the contact array 14b of the encoder 14 is composed of two columns of contacts each column including three contacts Ea to Ec; Ed, and a common contact 30. When the lens barrel 1 moves, then the brush 14a sweeps the contact array 14b, so that a brush segment 40a is seriatim brought into contact with the contacts Ea to Ec, and a brush segment 40b is seriatim brought into contact with the contacts Ed, while the brush segment 40c always contacts the common contact. As a result, the pattern of the 4-digit binary code outputted from the encoder 14 changes according to the position of the lens barrel 1. As illustrated equivalently in FIG. 2, the contacts Ed correspond to the same bit position and same bit level, "low" in this embodiment, so that a low level signal is detected from the same terminal when the brush segment 40b contacts any of these contact Ed.

The contacts Ea, Eb and Ec are provided to detect individual positions, namely, a lens barrel rest position, a wide-angle position, and a telephoto position, respectively, and are hereinafter referred to as sub-contacts. The contacts Ed disposed beside the sub-contacts Ea, Eb and Ec are main contacts for detecting the lens barrel rest position, the wide-angle position, and the telephoto position, respectively. The main contacts are staggered relative to the adjacent subcontacts in the axial direction in which the brush 14a moves.

Figure 4:
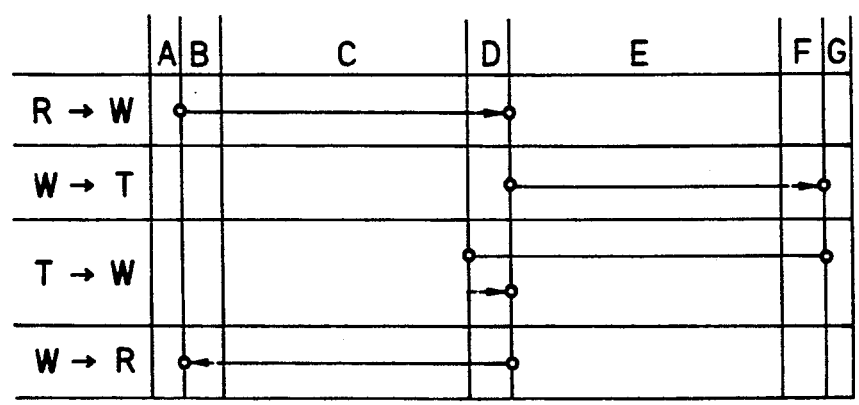
FIG. 4 is a table explaining the operation of the encoder shown in FIG. 3.

FIG. 4 explains the relationship between the brush position and the lens position. In that figure, the contact array 14b is sectioned into zones A to G, wherein the right end of the zone A corresponds to the lens rest position (R), and the right end of the zone D and the left end of the zone G correspond to the wide-angle and telephoto positions (W) and (T), respectively.

Referring to the flow chart of FIG. 5, the operation of the above lens driving device will be described, by way of example, with respect to the case in which the taking lens system is changed over from the telephoto position (T) to the wide-angle position (W).

Figure 5:
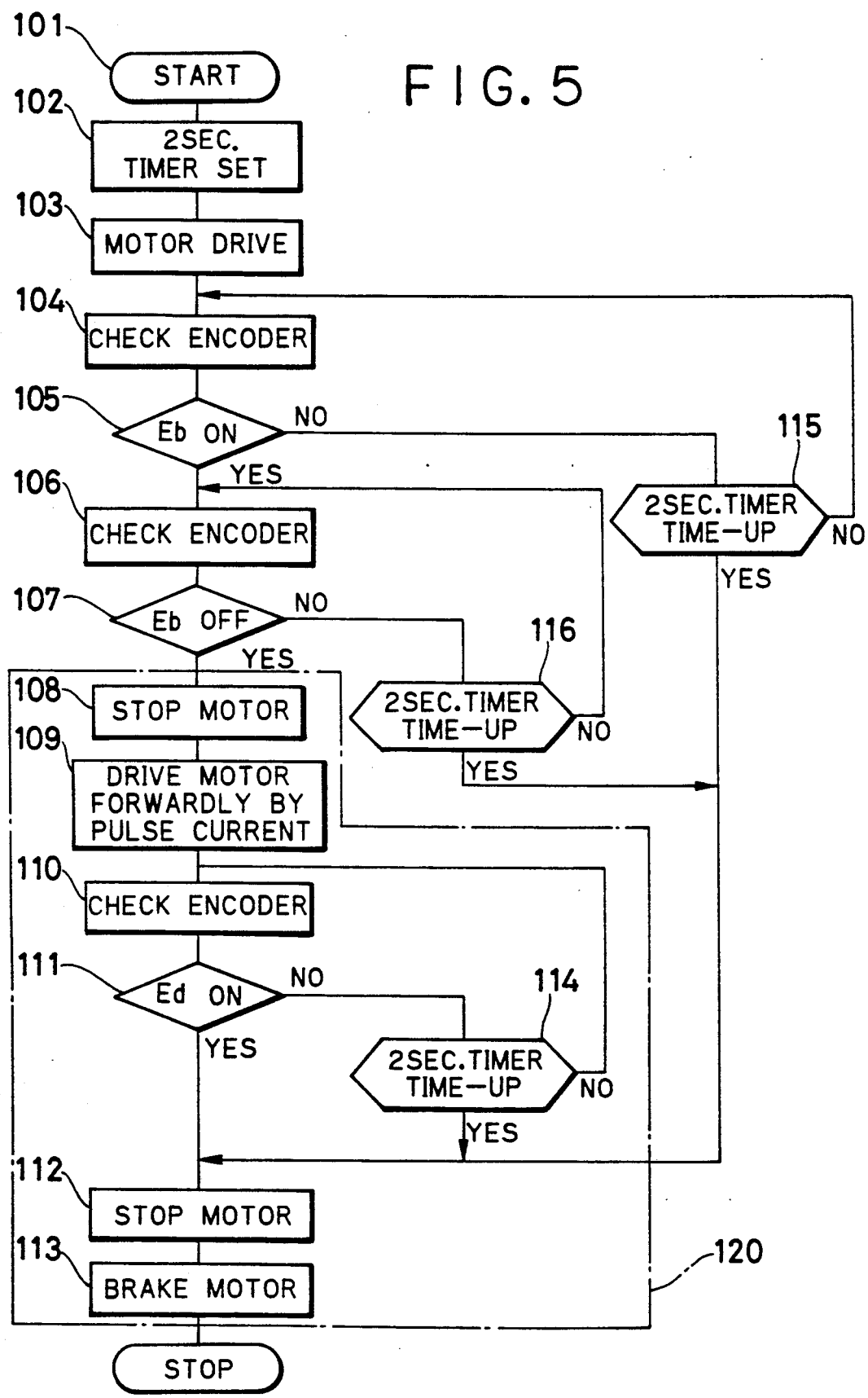
FIG. 5 is a flow chart explaining an example of program sequence for controlling the motor of the lens driving device.

When the taking lens has been in the position (t), upon turning the switch 16 on, the CPU 10 starts processing according to the flow chart of FIG. 5 (step 101). Firstly, a timer is set to start timing an interval of 2 sec. (step 102), and the motor 3 starts rotating in what will be called the reverse direction (step 103), thereby to move the lens barrel 1 backward along the optical axis relative to the stationary lens barrel. The CPU 10 checks the output signals from the encoder 14 until the sub-contact Eb is detected, that is, until the sub-contact Eb is switched on (steps 104, 105). Thereafter, the CPU 10 checks the encoder 14 until the subcontact Eb is switched off (steps 106, 107), and then stops the motor 3 (step 108). During the above operations, the motor 3 has been driven at a high speed by a continuous DC current signal from the second output port 18b. After once having stopped in step 108, the motor 3 is then driven intermittently by pulse current outputted from the first output port 18a, so that the motor 3 rotates forwardly stepwise, that is, at a lower speed (step 109) until the encoder 14 detects the main contact Ed (steps 110, 111). Upon detecting the main contact Ed, the motor 3 is stopped (step 112). So as surely to stop the motor 3, the CPU 10 outputs a drive signal simultaneously from the first and second output ports 18a and 18b, thereby short-circuiting both terminals of the motor 3 (step 113). Because the lens barrel 1 moves forwardly along the optical axis relative to the stationary lens barrel prior to stopping at the wide-angle position (T), backlash of the screw 2a is prevented and the optical properties of the taking lens system are properly maintained.

If the time interval of 2 sec. has passed before the sub-contact Eb is switched on in step 105, or before the subcontact Eb is switched off in step 107, or before the main contact Eb is switched off in step 111 (step 115, 116 or 114), it is judged that there is a hindrance to the movement of lens barrel 1, and the motor 3 is stopped (step 112).

The overall operation of the lens driving device will be described with reference to FIG. 4, wherein arrows indicate the movement of the brush 14a during change of focal length of the taking lens system. The portion of the arrow drawn with a solid line corresponds to the section in which the motor 3 is driven by continuous DC current to rotate at a high speed, whereas the portion drawn with a dashed line corresponds to the section in which the motor is driven by pulse current to rotate at a lower speed.

The third line of the table of FIG. 4 corresponds to the above-described mode wherein the taking lens system is changed over from the telephoto position to the wide-angle position (T - W). In this mode, the brush 14a is in the left end of the zone G, that is, in the position (T) before the switch 16 is operated. Upon the switch 16 being operated, the motor 3 is driven by continuous DC current to rotate in the reverse direction until the sub-contact Eb is once switched on and then off. Thereafter, the motor 3 is driven by pulse current to rotate in the forward direction until the main contact Ed adjacent to the sub-contact Eb is detected, thereby causing the lens barrel 1 to move forwardly.

If the taking lens system is moved from the rest position to the wide-angle position (R - W), the motor 3 is driven by continuous DC current to rotate forwardly until the sub-contact Eb is detected, as is shown in the first line of the table of FIG. 4. After the sub-contact Eb is detected, the motor 3 is driven by pulse current to rotate forwardly until the main contact Ed is detected. The second line of FIG. 4 shows the mode for changing over the taking lens system from the wide-angle position to the telephoto position (W - T), wherein the motor 3 is driven by continuous DC current to rotate forwardly until the sub-contact Ec is detected and is thereafter, driven by pulse current to rotate forwardly until the contact adjacent to the sub-contact Ec is detected. In order to move the taking lens system from the telephoto or wide-angle position to the rest position (T or W - R), the motor 3 is driven by continuous DC current to rotate reversely until the sub-contact Ea is detected and is, thereafter, driven by pulse current to rotate reversely.

Because the main contact Ed corresponds to the same bit position of the code generated by the encoder 14, the CPU can process the above operations of the first and second lines, that is, the R - W and W - T mode operations according to partially common sequence. Namely, after detecting the sub-contact Eb or Ec, the steps of temporarily stopping, stepwise rotating in the forward direction, and stopping again the motor 3 upon detection of the main contact Ed are commonly executed in these modes, so that it is possible to use the steps 108 to 114 of FIG. 5 as a common subroutine 120, and to jump into the subroutine 120 from the individual modes. In this way, a ROM of the CPU 10 for storing the program needs less capacity.

According to the above-described lens driving device, the motor for moving the taking lens system is driven at a relatively high speed to move the lens system into a neighboring position near the predetermined position corresponding to a given focal length, and is driven at a lower speed to move the lens system from the neighboring position to the predetermined position, so that the motor will not overrun upon stopping. Therefore, the taking lens system is surely positioned in the predetermined position simultaneously with the stopping of the motor. Because the low speed driving of the motor can be controlled by the CPU according to a common program in any mode, the increase in capacity of the ROM for storing the control program for this method can be kept to a minimum.

Furthermore, because the motor will not overrun, it is unnecessary to provide a dead zone in the power transmission mechanism, so that the mechanism can be made simple in construction. In addition, it is unnecessary to form the parts of the mechanism with high accuracy, so that manufacturing cost can be lowered.

Because there is no need for moving the lens barrel back and forth near a predetermined position so as to position the lens in the predetermined position, the lens driving device of the invention is easy to control, and is precise in positioning.

However, to execute the above-described sequence shown in FIG. 5, it is necessary to provide two 2 sec. timers for limiting the respective delay times for switching on the sub-contact Eb (step 115) and switching it off (step 116). But, since the two timers relate to detection of the same subcontact Eb, it is desirable to use a common timer instead, so as to minimize the necessary capacity of the ROM.

Furthermore, according to the above sequence, switching-off of the sub-contact Eb is detected directly after detecting the switching-on of the contact Eb (steps 105 to 107), but there is the possibility of disconnecting the brush 14a from the sub-contact Eb if chattering occurs before the brush 14a actually switches off the sub-contact Eb. In such a case, it mistakenly registers o the CPU 10 that the subcontact Eb is switched off, and so the CPU 10 mistakenly stops the motor 3.

Figure 6:
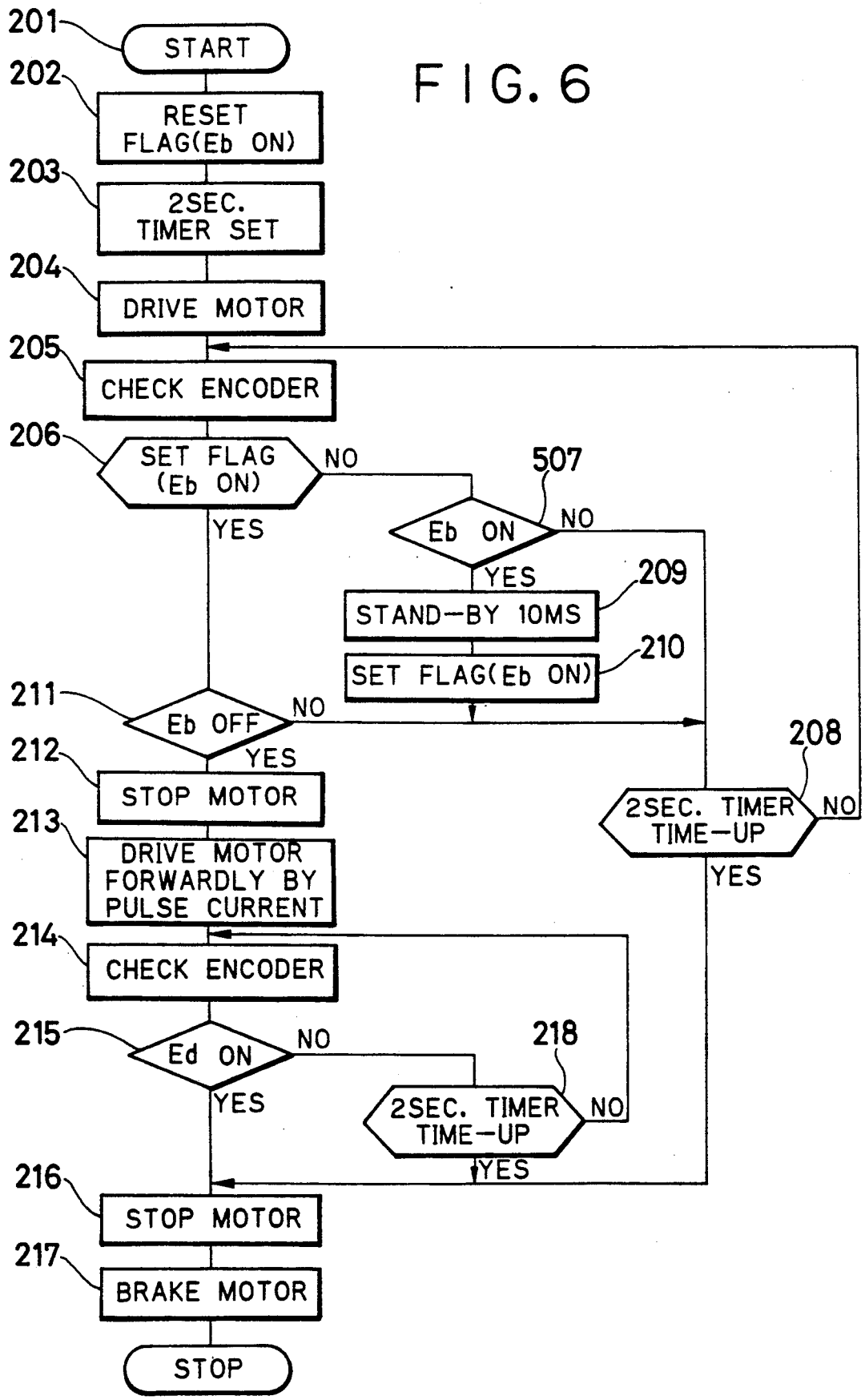
FIG. 6 is a flow chart explaining another example of program sequence for controlling the motor of the lens driving device.

In view of the foregoing, another preferable program sequence for switching over the focal length is shown in FIG. 6 which minimizes the necessary capacity of the ROM as well as the possibility of the above-described mistake being made. Also, the sequence of FIG. 6 relates to only the T - W mode, wherein the taking lens system is changed over from the telephoto position to the wide-angle position, as an example.

The flow chart of FIG. 6 starts upon operation of the switch 16 (step 201), and an Eb ON flag is reset concurrently with setting a 2 sec. timer to start timing a predetermined interval of 2 sec. (steps 202, 203). Then, the motor 3 is driven to rotate reversely, thereby moving the lens barrel 1 rearwardly along the optical axis (step 204). During the movement of the lens barrel 1, it is determined by checking the encoder 14 whether the Eb ON flag is set (steps 105, 106). Unless the Eb ON flag is not set, it is determined whether the sub-contact Eb is switched on (step 507). If not, steps 205, 206 and 507 are repeated until the 2 sec. timer times up (step 208).

When the sub-contact Eb is switched on in step 507, the Eb ON flag is set after 10 ms, so that the flag may be set after the brush 14a is surely brought into contact with the sub-contact Eb (step 210). Setting the Eb ON flag after standing by for 10 ms from the detection of switching-on of the sub-contact Eb will prevent the above-described mistake caused by chattering. Thereafter, unless the 2 sec. interval does not expire in step 208, steps 205 and 206 are repeated and, because the Eb ON flag has been set in step 210, step 206 proceeds to step 211 wherein it is determined whether the subcontact Eb is switched off. So far as the sub-contact Eb is not switched off, steps 208, 205 and 206 are repeated. When the sub-contact Eb is switched off, the motor 3 is temporarily stopped (step 212), and then is driven by pulse current to rotate forwardly (step 213). The following steps 214 to 218 correspond to the steps 110 to 114 of the flow chart shown in FIG. 5:

According to the control program of FIG. 6, a flag is set to indicate detection of a sub-contact, so that the ROM requires less capacity for storing a program sequence for checking whether there is any error in operation, that is, for comparing a predetermined time interval with the delay time required to switch the sub-contact on and with the delay time required to switch the sub-contact off.

Figure 7:
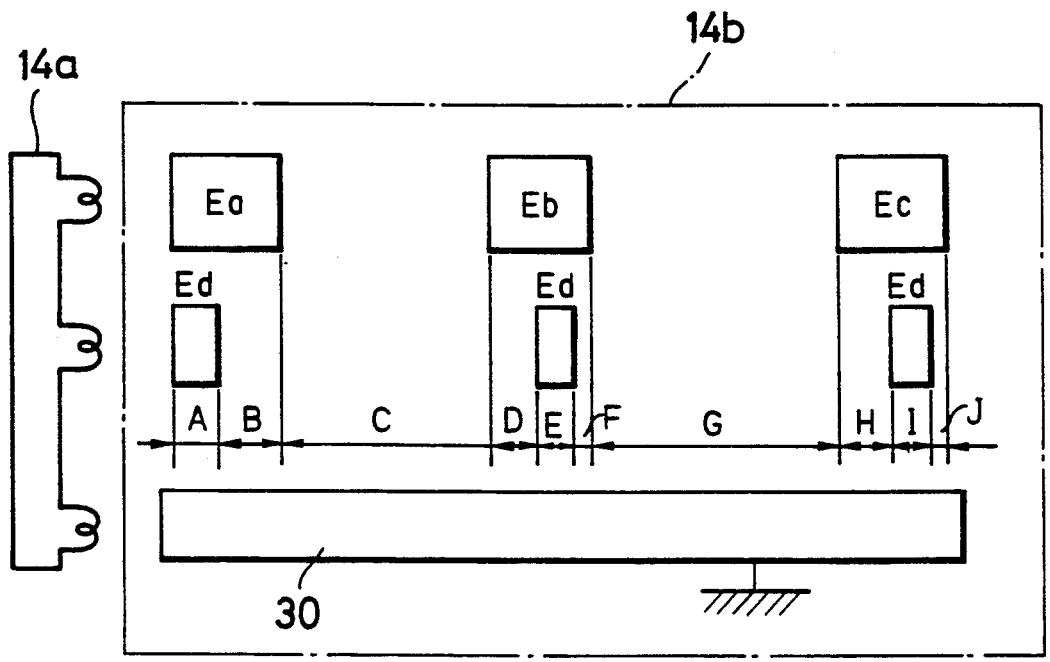
FIG. 7 shows schematically a second embodiment of the encoder of the lens driving device.
Figure 8:
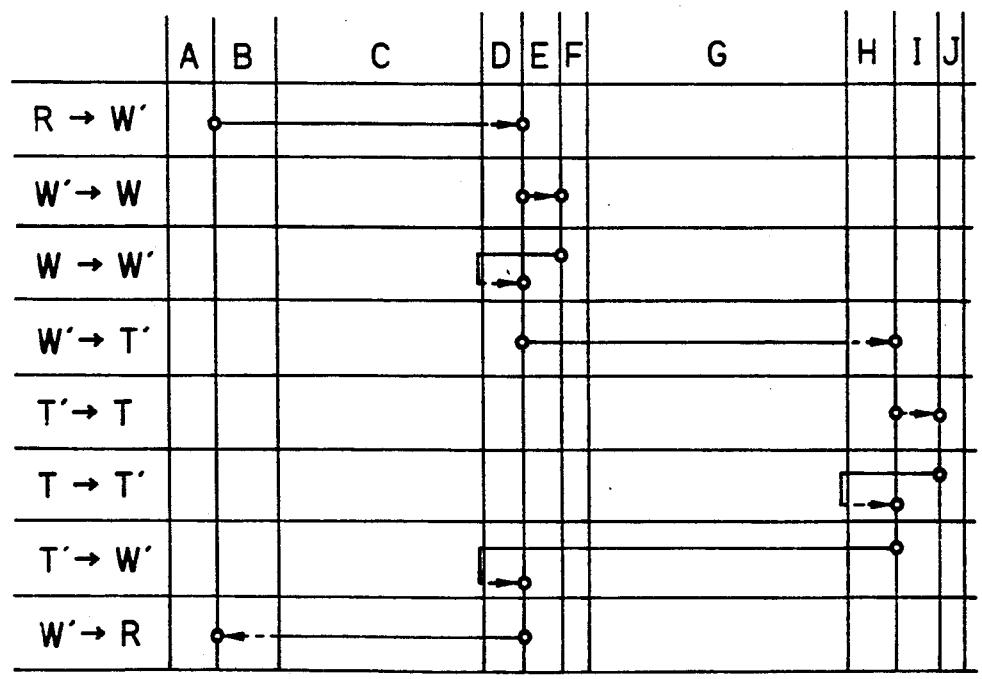
FIG. 8 is a table explaining the operation of the encoder shown in FIG. 7.

Referring now to FIGS. 7 and 8 showing another embodiment of the invention, there is provided an encoder 14 comprising a brush 14a and a contact array 14b which is substantially the same as the contact array of FIG. 3 except for the arrangement of main contacts Ed. According to this arrangement, the contact array 14b is sectioned into ten zones A to J. A border line between the zones A and B corresponds to the lens rest position, whereas a border line between the zones E and F corresponds to the wide-angle position, and a border line between the zones I and J corresponds to the telephoto position.

The operation will be described with reference to a table shown in FIG. 8, wherein arrows indicate the direction of movement of the brush 14a, and the portion of the arrow drawn by solid line corresponds to the section in which the motor 3 is driven by continuous DC current, whereas the portion drawn by dashed line corresponds to the section driven by pulse current, as in FIG. 4.

The first to third rows of the table of FIG. 8 show a mode wherein the taking lens system is at first in the rest position, and then in a wide-angle photography position. In this mode, upon operation of the switch 16, the motor 3 is driven by continuous DC current to move the lens barrel 1 forwardly along the optical axis. When a sub-contact Eb for detecting a range including the wide-angle position is switched on as a result of the forward movement of the lens barrel, the motor temporarily stops rotating and is thereafter driven by pulse current until the left end of a main contact Ed adjacent to the sub-contact Eb is detected. The motor 3 and hence the lens barrel 1 stand by in this position (W') and, upon depression of the shutter release button, the motor 3 is driven by pulse current to move the lens barrel 1 forwardly until the main contact Ed is switched off, as is shown in the second row of FIG. 8. The moment the switching-off of the main contact Ed is detected and the motor 3 is stopped, the system is set in the wide-angle position (W), and the shutter is actually released. Driving the motor 3 stepwise by pulse current will improve the accuracy of positioning because it prevents the overrunning of the motor 3. After the shutter release, the motor 3 is rotated reversely to retract the lens barrel 1 until the sub-contact Eb is switched off, and is then driven by pulse current to move the lens barrel 1 at a lower speed until the main contact Ed is switched on. In this position (W'), the motor 3 stands by, awaiting the next operation of the switch 16 or the shutter release button. The lens barrel 1 is stopped in the stand-by position (W') after being moved forwardly in this way, so that backlash of the screw mechanism is compensated.

As described above, the lens barrel 1 stops in the stand-by position (W') after moving toward the wide-angle position in response to the operation of the switch 16, and thereafter when the release button is activated, the lens barrel 1 is moved into the wide-angle position (W) while monitoring the output of the encoder. Therefore, even if the lens barrel 1 is unwillingly moved by external force, e.g. by touching, since the position of the lens barrel 1 is again monitored to set it in the wide-angle position precisely prior to shutter release, the focus of the taking lens system is not disrupted.

The fourth to sixth rows of FIG. 8 show an example wherein the taking lens system is moved to the telephotography mode. If the switch 16 is operated when the lens system is in the wide-angle position, the motor is driven to move the barrel forwardly until a sub-contact Ec for detecting a range including the telephoto position is detected. After the detection of the sub-contact Ec, the motor is driven by pulse current until the left end of the main contact Ed adjacent to the sub-contact Ec is detected. In this position (T'), the motor 3 stands by, awaiting the operation of the shutter release button. Upon operation of the shutter release button, the motor 3 is driven by pulse current to move the lens barrel forwardly again until it is determined that the main contact Ed is switched off (T). At this moment, the shutter is released. After the completion of the shutter release operation, the lens barrel 1 is moved rearwardly until the sub-contact Ec is switched off, and is then moved forwardly until the main contact Ed is switched on, so as to compensate backlash of the screw mechanism. In this position (T'), the motor 3 stands by awaiting the next operation.

When changing over the taking lens system between wide-angle and telephoto ranges, upon operation of the switch 16, the initial position of the lens is determined by monitoring the encoder with respect to the bit positions corresponding to the sub-contacts Ea, Eb and Ec. If the initial position is in the wide-angle range defined by the sub-contact Eb (Eb ON), then the taking lens system is changed to the telephoto range defined by the sub-contact Ec. If the initial position is in the telephoto range (Ec ON), then the taking lens system is changed to the wide-angle range upon operation of the switch 16. Even if the brush 14a were removed from the main contact Ed by touching the lens barrel 1 while the camera is in the stand-by condition, since the sub-contacts Eb and Ec each cover a wide range, it is still possible to determine whether the sub-contact Eb or Ec is switched on, so that the changeover operation can be performed without any trouble.

The reason why the respective ranges covered by the sub-contacts Eb and Ec include the zone F, J forwardly of the associated main contact is that, because the motor 3 is stopped at the moment when the main contact is switched off, if the sub-contact were also switched off simultaneously therewith, it would be impossible to detect the position of the lens barrel 1 based on the code output from the encoder when the lens barrel 1 stops in this condition for some reason, such as low charge of the battery 22 or the like. By providing the zones F and J, it is possible to determine the position of the lens barrel 1 after the shutter release operation. In case the battery 22 is weak when the lens barrel 1 is in the zone C or G, the lens barrel 1 is once moved in the rest position for security after a new battery is loaded, because no sub-contact Ea, Eb, Ec is detected in this condition.

According to this embodiment, because the lens barrel 1 stops in the stand-by position (W' or T') after moving in response to the operation of the switch 16, even if the lens barrel 1 is accidentally displaced by external force from the stand-by position, the position of the lens barrel 1 is again monitored to set it in the predetermined position precisely when the release button is activated, so that the focus of the taking lens system and the changeover operation thereof will not be disrupted by the applied external force. Because the stand-by positions are very near the predetermined focal length position, the lens driving apparatus of this embodiment can quickly respond to the shutter release operation.

As described above, because the movable lens barrel 1 is moved through a combination of the male screw thread 2a and the female screw thread 1a, the backlash exists between these screw threads, the stopped position of the taking lens system upon movement in the forward direction will change slightly from that upon movement in the rearward direction even though the encoder detects the taking lens system as having stopped both times in the same position. For this reason, the taking lens system is always stopped after being moved in the same predetermined direction, in order to maintain the optical positions of the lens unchanged.

However, in a camera wherein the magnification of the viewfinder is changed according to the focal length of taking lens in a manner as described with reference to FIG. 1, the viewfinder switching mechanism 5 and 7 applies a load to the driving rod 2 when the lens barrel 1 moves rearwardly, in this embodiment, while pushing the switching lever 7. As a result, a force couple comprising the load from the switching mechanism 5 and 7 and the driving force from the rod 2 is applied to the lens barrel, so that the lens barrel 1 can incline to the optical axis during movement in the rearward direction. It is to be noted that the force couple will be applied to the lens barrel moving in the forward direction if the lever 7 is urged against the pin 5 and is pushed by the pin 5 when the lens barrel 1 moves forwardly.

If the lens barrel 1 inclines to the optical axis, then also the movable lens group held in the lens barrel 1 will so incline, whereby the focus of the taking lens system would be deflected from the correct point. Therefore, it is desirable to compensate such incline of the movable lens barrel 1 relative to the correct optical axis in a camera wherein the lens barrel bears a load from the viewfinder switching mechanism.

To achieve the above object, according to still another embodiment of the invention, and on the assumption that the lens barrel 1 always stops at a final position after moving in a predetermined direction, the lens barrel 1 is further moved by a given distance in the opposite direction to that predetermined direction after the final position is detected, and then is moved again in the predetermined direction until it is positioned in the final position.

Figure 9:
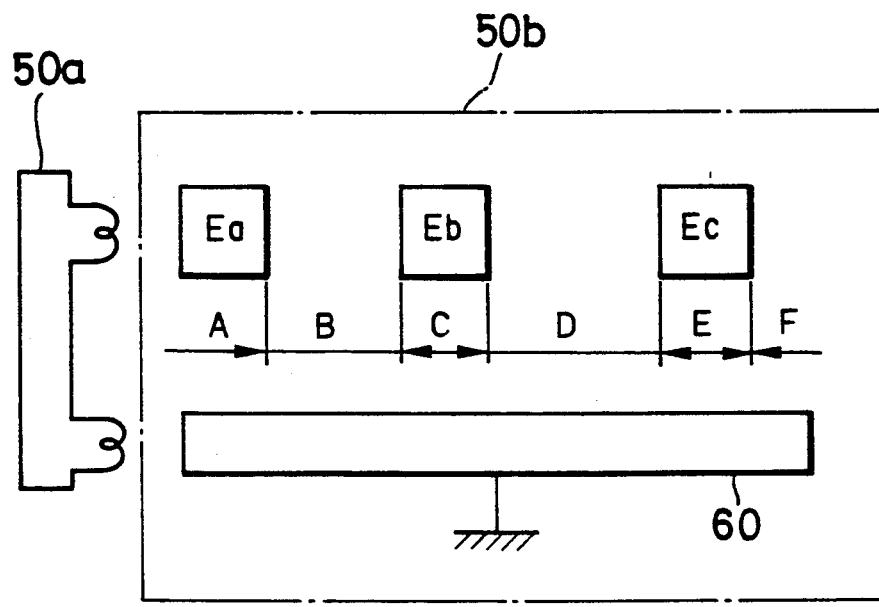
FIG. 9 shows schematically a third embodiment of the encoder of lens driving device.
Figure 10:
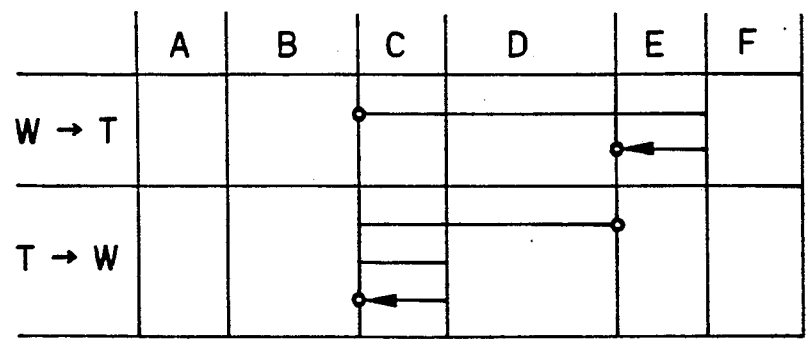
FIG. 10 is a table explaining the operation of the encoder shown in FIG. 9.

FIGS. 9 and 10 explain the operation of the lens driving device according to this embodiment. An encoder comprises a brush 50a and a contact array 50b in which contacts Ea, Eb and Ec are associated with the lens rest position, the wide-angle position and the telephoto position, respectively. A contact 60 is a common contact. It is predetermined that a borderline between zones A and B corresponds to the lens rest position, whereas a borderline between zones B and C corresponds to the wide-angle position, and a borderline between zones D and E corresponds to the telephoto position.

The circuitry of the lens driving device of this embodiment being substantially the same as in the above embodiment, when the switch 16 is operated, if the taking lens system is in the wide-angle position at that time, then the lens barrel 1 is moved forwardly until the contact Ec is switched off after being switched on. When it is determined that the contact Ec is switched off, the motor 3 is driven to rotate in the reverse direction to the preceding direction, thereby moving the lens barrel 1 rearwardly through a zone E. In this way, the lens barrel 1 is stopped in the telephoto position after being moved rearwardly, so as to compensate backlash of the screw mechanism.

When the taking lens system is moved rearwardly from the telephoto position to the wide-angle position, the lens barrel 1 will incline under the load from the viewfinder switching mechanism 5 and 7. In order to compensate the resulting slant of the lens barrel, the lens driving device is so controlled as shown in the second line of the table of FIG. 10. Namely, the motor 3 is driven to move the lens barrel 1 rearwardly from the telephoto position until it is determined that the contact Eb is switched off after having been switched on. Then, the motor 3 is driven to rotate in the reverse direction so as to move the lens barrel 1 forwardly by a given distance. The forward movement corrects the slant of the lens barrel 1 that is caused by the applied load from the viewfinder switching mechanism 5 and 7 during the rearward movement. The contact Eb is again switched on because of the forward movement of the lens barrel 1. The forward movement is stopped upon detection of the switching-off of the contact Eb, and then the motor 3 is reversed in its rotational direction so as to move the lens barrel 1 rearwardly until the taking lens system is set in the wide-angle position. This final rearward movement is to compensate the backlash of the screw mechanism produced during the forward movement. In this way, the optical position of the taking lens system is maintained correct, thereby reducing the possibility of taking out-of-focus pictures to a minimum.

Although the present invention has been fully described by way of the preferred embodiments thereof with reference to the accompanying drawings, it is to be noted that various changes and modifications will be apparent to those skilled in the art. Therefore, unless otherwise such changes and modifications depart from the scope of the present invention, they should be construed as being included therein.

For example, the above-mentioned wide-angle and telephoto positions are relative positions, and it is possible that the taking lens system can be changed over between a standard-photography position and a telephoto position, or between a standard-photography position and a wide-angle position. Although the taking lens system of the above embodiment is switched over between two predetermined focal length positions and between either of these positions and a rest position upon operation of a switch, it is also possible to provide a zooming switch in addition to such a switch, in order to stop the taking lens system at an optional focal length position after moving finally in a predetermined direction.

What is claimed is:

1. A lens driving method in which a motor is driven, upon operation of a switch, to move a taking lens system so as to change over said taking lens system between at least two focal length positions, said method comprising the steps of:
    driving said motor at a high speed to move said taking lens system toward one said focal length position upon operation of said switch;
    driving said motor at a lowered speed when said taking lens system reaches a predetermined sub-position slightly displaced from said one focal length position; and
    stopping said motor from being driving at the lowered speed when said taking lens system reaches said one focal length position, said positions being detected by an encoder, said encoder being comprised by a main group of contacts, a group of sub-contacts, and at least first and second contact brushes moving with said taking lens system respectively along said first and second contact groups, said main contact group having first and second contact groups, said main contact group having first to third main contacts having basic ends disposed in said first and second focal length positions and in said rest position, respectively, said group of sub-contacts having first to third sub-contacts respectively associated with said first to third main contacts but each covering a broader range than each said main contact, a basic end of said first to third sub-contacts being positioned in said first and second sub-positions, and a third sub-position near said rest position, respectively.

2. A lens driving method as defined in claim 1, wherein said step of driving said motor at a lowered speed is always performed to move said taking lens system in a first direction, and said sub-position is displaced in a second direction opposite to said first direction from said focal length position.

3. A lens driving method as defined in claim 1, wherein, when said taking lens system is moved in a first direction toward a said focal length position, said lens system reaches said sub-position before reaching said focal length position, and when said taking lens system is moved in a second direction opposite to said first direction toward a said focal length position, said lens system reaches said sub-position after passing through said focal length position, and thereafter said lens system is moved in said first direction at a lowered speed toward said focal length position.

4. A lens driving method as defined in claim 1, wherein said at least two focal length position, include a first and a second focal length position, and said sub-positions include first and second sub-positions respectively associated with said first and second focal length positions, said first sub-position being disposed between said first and second focal length positions, whereas said second sub-position being disposed on the side of second focal length position opposite said first focal length position, and wherein said lens system reaches said first sub-position before reaching said first focal length position when said lens system is moved in a first direction, and reaches said second sub-position after passing through said second focal length position when said lens system is moved in a second direction opposite to said first direction, and thereafter is moved in said first direction at a lowered speed toward said second focal length position.

5. A lens driving method as defined in claim 4, wherein said first focal length position is of a long focal length for telephotography in which said taking lens system protrudes forwardly a maximum distance, and said second focal length position is of a short focal length for wide-angle photography.

6. A lens driving method as defined in claim 5, further including retracting said taking lens system into a rest position which is retracted farther from said second focal length position when the camera is not used.

7. A lens driving method as defined in claim 6, wherein when said taking lens system is moved from said rest position to said second focal length position, said taking lens system moves in said first direction, and stops at said second focal length position after passing through said second sub-position, and when said taking lens system is moved in said second direction from said first focal length position toward said second focal length position, said taking lens system reaches said second sub-position after passing through said second focal length position, and thereafter is moved in said first direction at a lowered speed toward said second focal length position.

8. A lens driving method as defined in claim 1, further comprising controlling the starting and stopping and speed of said motor depending on position data output from said encoder with a CPU.

9. A lens driving method as defined in claim 8, wherein said encoder is comprised by a main group of contacts, a group of sub-contacts, and at least first and second contact brushes moving with said taking lens system respectively along said first and second contact groups, said main contact group having first to third main contacts having ends disposed in said first and second focal length positions and in said rest position, respectively, said group of sub-contacts having first to third sub-contacts respectively associated with said first to third main contacts but each covering a broader range than each said main contact, a basic end of said first to third sub-contacts being positioned in said first and second sub-positions, and a third sub-position near said rest position, respectively.

10. A lens driving method as defined in claim 8, wherein said second main contact is disposed within the range covered by said second sub-contact, and said CPU sets a flag when a brush of said second contact contacts said second sub-contact while said taking lens system is moving in said second direction to be set in said second focal position, and thereafter said CPU reverses said motor when said second contact brush passes through the basic end of said second sub-contact during said flag being set, and drives said motor at a lowered speed to move said taking lens system in said first direction.

11. A lens driving method as defined in claim 1, wherein the end opposite to the basic end of said first main contact is disposed in a fourth sub-position, and the end opposite to the basic end of said second main contact is disposed in a fifth sub-position, said taking lens system being set in said fourth or fifth sub-position, being moved in said first direction during a time interval from a shutter release operation to the operation of said shutter, and being stopped when said first contact brush passes through the basic end of said main contact.

12. A lens driving method as defined in claim 11, wherein said first and second main contacts are disposed within the range covered by said first and second sub-contacts, respectively.

13. A lens driving method as defined in claim 1, wherein said taking lens system comprises a lens movable according to the focal length and a stationary lens, said movable lens being held in a movable lens barrel driven by said motor, said stationary lens being held in a fixed lens barrel which supports said movable lens barrel slidably therein.

14. A lens driving method as defined in claim 13, wherein said movable lens barrel is threaded with a feed screw which is rotated by said motor.

15. A lens driving method in which a motor is driven, upon operation of a switch, to move a taking lens system so as to change over the focal length of said taking lens system, said method comprising the steps of:
driving said motor to move said taking lens system upon operation of said switch;
detecting the position of said taking lens system;
stopping said motor when said taking lens system reaches a predetermined sub-position slightly displaced from a predetermined focal length position; and
driving said motor to move said taking lens system from said sub-position into said focal length position upon operation of a shutter release button prior to actuating a shutter that exposes said taking lens system, said positions being detected by an encoder, said encoder being comprised by a main group of contacts, a group of sub-contacts, and at least first and second contact brushes moving with said taking lens system respectively along said first and second contact groups, said main contact group having first to third main contacts having basic ends disposed in said first and second focal length positions and in said rest position, respectively, said group of sub-contacts having first to third subcontacts respectively associated with said first to third main contacts but each covering a broader range than each said main contact, a basic end of said first to third sub-contacts being positioned in said first and second sub-positions, and a third sub-position near said rest position, respectively.

16. A lens driving method as defined in claim 15, further comprising the steps of driving said motor to move said taking lens system from said focal length position to said sub-position after the shutter release operation.

17. A lens driving method as defined in claim 16, wherein said taking lens system has first and second focal length positions, said method further comprising the step of driving said motor to move said taking lens system from a first sub-position slightly displaced from said first focal length position to a second sub-position slightly displaced from said second focal length position.

18. A lens driving method as defined in claim 17, wherein said motor is stopped always after being finally moved in a predetermined direction.

19. A lens driving method as defined in claim 18, wherein the speed of said motor is lowered immediately before stopping said motor.

20. A lens driving method as defined in claim 19, further comprising the step of retracting said taking lens system in a rest position for protecting said taking lens system.

21. A lens driving apparatus for changing over the focal length of a taking lens system comprising:
a movable lens barrel;
a reversible motor driven to move said movable lens barrel back and forth along the optical axis of said taking lens system for changing over the focal length;
a transmission mechanism for transmitting rotational power of said motor to said lens barrel; and
an encoder for detecting the position of said taking lens system, said encoder having a brush and a contact array including a first column of contacts, a first end of each contact of said first column corresponding to a focal length position of said taking lens system in the direction of said optical axis, said contact array further including a second column of contacts, a first end of each contact of said second column being displaced in an axial direction from said first end of an adjacent contact of said first column and being located at a position at which the speed of said motor is lowered.

22. A lens driving apparatus as defined in claim 21, wherein a second end of each contact of said first column opposite to said first end corresponds to a position at which the speed of said motor is lowered.

23. A lens driving apparatus as defined in claim 21, wherein a second end of each contact of said first column opposite to said first end corresponds to a position at which the direction of drive of said motor is reversed.

24. A lens driving apparatus as defined in claim 21, wherein said first column of contacts corresponds to a same bit position of code output from said encoder, whereas said second column of contacts correspond each to a respective bit position.

25. A lens driving apparatus as defined in claim 24, wherein an end of each contact of said first column opposite to said first end thereof is located at a position at which said taking lens system is stopped, and said taking lens system is moved into said focal length position upon operation of a shutter release button.

26. A lens driving apparatus as defined in claim 25, wherein each contact of said second column covers a broader axial range than the contact of said first column in both directions.

* * * * *